United States Patent
Fejfar et al.

(10) Patent No.: US 9,891,978 B1
(45) Date of Patent: Feb. 13, 2018

(54) FAULT DETECTION IN A MULTI-CORE SAFETY-CRITICAL AVIONICS SYSTEM

(71) Applicant: Rockwell Collins, Inc., Cedar Rapids, IA (US)

(72) Inventors: Donald Mark Fejfar, Marion, IA (US); Eric N. Anderson, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 131 days.

(21) Appl. No.: 14/958,635

(22) Filed: Dec. 3, 2015

(51) Int. Cl.
*G06F 11/00* (2006.01)
*G06F 11/07* (2006.01)

(52) U.S. Cl.
CPC ...... *G06F 11/0772* (2013.01); *G06F 11/0724* (2013.01); *G06F 11/0751* (2013.01)

(58) Field of Classification Search
CPC ............. G06F 11/0724; G06F 11/0751; G06F 11/0754; G06F 11/076; G06F 11/0772
See application file for complete search history.

(56) References Cited

U.S. PATENT DOCUMENTS

| | | | | |
|---|---|---|---|---|
| 5,819,188 | A * | 10/1998 | Vos | G05B 9/02 244/194 |
| 6,285,298 | B1 * | 9/2001 | Gordon | G05B 9/03 340/945 |
| 7,890,797 | B2 * | 2/2011 | Davies | G06F 11/1675 701/31.4 |
| 8,977,848 | B1 * | 3/2015 | Tomlinson | G06F 9/5061 713/166 |
| 9,562,963 | B2 * | 2/2017 | Colin | G01C 21/20 |
| 2006/0167598 | A1 * | 7/2006 | Pennarola | G08G 5/0013 701/11 |
| 2008/0177428 | A1 * | 7/2008 | Fok | G06Q 40/08 701/7 |
| 2011/0040470 | A1 * | 2/2011 | Qiu | F01D 19/00 701/100 |
| 2013/0197721 | A1 * | 8/2013 | Gu | B64D 45/00 701/3 |
| 2013/0311006 | A1 * | 11/2013 | Ahmad | B64C 19/00 701/3 |
| 2015/0103447 | A1 * | 4/2015 | Brouwer | H02H 7/00 361/1 |

OTHER PUBLICATIONS

Certification Authorities Software Team (CAST), Position Paper, CAST-32, Multi-core Processors, May 2014, pp. 1-34.

* cited by examiner

*Primary Examiner* — Elmira Mehrmanesh
(74) *Attorney, Agent, or Firm* — Angel N. Gerdzhikov; Donna P. Suchy; Daniel M. Barbieri

(57) ABSTRACT

A system and method may ensure certified operation of a safety-critical avionics system incorporating a multi-core processor (MCP) aboard an aircraft via external architectural mitigation. A redundant processing element (RPE) may be associated with a processing core of the MCP and with safety-critical applications configured to execute on the core. The critical applications generate critical results based on sensed critical data parameters and pass the parameters and results to an external system monitor. The system monitor performs fault detection external to the original core by comparing the critical results and the critical data parameters and notifies the associated critical application if a fault is detected. The associated critical application may then log the fault to a fault history, reset an associated sensor, or notify the crew of the fault.

15 Claims, 2 Drawing Sheets

FAULT DETECTION IN A MULTI-CORE SAFETY-CRITICAL AVIONICS SYSTEM

BACKGROUND

Contemporary processing units are often multi-core processors (MCP) with increasing levels of system-on-a-chip (SoC) capability. Regulatory agencies have yet to identify an acceptable approach to certifying the use of MCPs for handling safety-critical applications in an airborne system. For example, aircraft display systems may incorporate safety-critical applications for compiling critical data parameters and forwarding those parameters to a graphics engine for generating cockpit displays. If such a safety-critical application were to fail, the result would be catastrophic (e.g., probable loss of the aircraft as well as its crew or passengers). Accordingly, architectural mitigations (i.e., fault detection and response) must provide assurance that safety-critical application failures will be extremely improbable (e.g. $10e^{-9}$ probability per flight hour). The Certification Authorities Software Team, in its May 2014 position paper "Multi-core Processors" which is herein incorporated in its entirety, identified various challenges and hurdles which preclude the certification of MCP use. For example, the existence of coherency fabrics, interference channels, or the dynamic reallocation of shared system resources may lead to non-deterministic results which preclude the successful execution of safety-critical applications.

SUMMARY

Embodiments of the inventive concepts disclosed herein are directed to a system and related method for providing certified operation of safety-critical avionics applications via a multi-core avionics processor. Fault detection is provided by system monitors external to the active processing cores on which the safety-critical applications are configured to execute. The individual fault history of each pach processing core is constructed over time, and may be monitored and analyzed to determine fault trending and the optimal assignments of safety-critical applications to processing cores and processing units, selecting away from fault-prone cores and flagging processing units displaying high or atypical fault trends for further analysis or diagnosis.

In a first aspect, embodiments of the inventive concepts disclosed herein are directed to a system for certified safety-critical avionics operation aboard an aircraft. The system may include one or more redundant processing elements (RPE). The system may include a multi-core processor (MCP) having one or more processing cores distributed among at least one processing unit. The system may assign each RPE to a processing core; each RPE may include safety-critical applications configured to execute on the associated processing core. A safety-critical application may receive a critical data parameter and generate a critical result associated with the critical data parameter, sending the critical data parameter and critical result to an external system monitor. The system monitor may detect a fault associated with the safety-critical application based on the received critical result and the received critical data parameter, and notify the safety-critical application of the detected fault. The associated safety-critical application may process the detected fault.

In a further aspect, the inventive concepts disclosed herein are directed to a system wherein the processing unit includes at least one of a single-core processor, a dual-core processor, and a multi-core (i.e., having three or more cores) processor.

In a further aspect, the inventive concepts disclosed herein are directed to a system wherein the critical data parameter includes at least one parameter sensed by an associated sensor of the aircraft.

In a further aspect, the inventive concepts disclosed herein are directed to a system wherein the system monitor is configured to detect a fault by comparing the critical data parameter and a generated critical result.

In a further aspect, the inventive concepts disclosed herein are directed to a system wherein the safety-critical application is configured to generate the critical result by encrypting the critical data parameter.

In a further aspect, the inventive concepts disclosed herein are directed to a system further including at least one fault log of the MCP, the fault log including a fault history associated with each processing core of the MCP, and at least one warning device coupled to the MCP.

In a further aspect, the inventive concepts disclosed herein are directed to a system wherein the system monitor is configured to process a detected fault by at least one of: logging at least one of the safety-critical application associated with the detected fault, the RPE associated with the safety-critical application, and the processing core to which the RPE is assigned and on which the safety-critical application executes.

In a further aspect, the inventive concepts disclosed herein are directed to a system wherein the associated safety-critical application is configured to generate an alert associated with a detected fault, and deliver the alert to a crewmember of the aircraft via the warning device.

In a further aspect, the inventive concepts disclosed herein are directed to a system wherein the warning device includes at least one of a flight deck annunciator or other auditory warning device, a visual display system, and a stick-shaker or other tactile warning device.

In a further aspect, the inventive concepts disclosed herein are directed to a system wherein at least one RPE is assigned to an associated processing core based on the fault history associated with the processing core.

In a still further aspect, the inventive concepts disclosed herein are directed to a method for certified operation of a safety-critical avionics system aboard an aircraft. The method may include assigning at least one redundant processing element (RPE) to a processing core of a multi-core processor (MCP) of the system, the MCP including two or more processing cores distributed among at least one processing unit and the RPE including at least one safety-critical application configured to execute on the associated processing core. The method may include receiving a critical data parameter via the safety-critical application. The method may include generating a critical result based on the critical data parameter via the safety-critical application and sending the critical data parameter and the critical result to an external system monitor. The method may include detecting a fault associated with the safety-critical application via the system monitor by based on the received critical data parameter and the received critical result, and notifying the associated safety-critical application of the detected fault. The method may include processing the at least one detected fault via the associated safety-critical application.

In a further aspect, embodiments of the inventive concepts disclosed herein are directed to a method further including receiving a critical data parameter sensed by a sensor of the aircraft via the safety-critical application.

In a further aspect, embodiments of the inventive concepts disclosed herein are directed to a method further including resetting the sensor associated with the safety-critical application.

In a further aspect, embodiments of the inventive concepts disclosed herein are directed to a method further including logging at least one of the safety-critical application associated with the detected fault, the RPE associated with the critical application, and the processing core to which the RPE is assigned to a fault log associated with the processing core.

In a further aspect, embodiments of the inventive concepts disclosed herein are directed to a method further including assigning an RPE to a processor core of the MCP based on a fault log associated with the processing core.

In a further aspect, embodiments of the inventive concepts disclosed herein are directed to a method further including generating an alert associated with the detected fault via the associated safety-critical application and delivering the alert to a crewmember of the aircraft via a warning device of the aircraft.

In a further aspect, embodiments of the inventive concepts disclosed herein are directed to a method further including generating a critical result by encrypting a received critical data parameter via the safety-critical application.

In a further aspect, embodiments of the inventive concepts disclosed herein are directed to a method further including detecting a fault associated with the safety-critical application by comparing a received critical data parameter and a generated critical result.

BRIEF DESCRIPTION OF THE DRAWINGS

The inventive concepts disclosed herein may be better understood by those skilled in the art by reference to the accompanying figures in which.

DETAILED DESCRIPTION

Features of the inventive concepts disclosed herein in their various embodiments are exemplified by the following descriptions with reference to the accompanying drawings, which describe the inventive concepts with further detail. It is to be understood that both the foregoing general description and the following detailed description are exemplary and explanatory only and are not necessarily restrictive of the inventive concepts disclosed and claimed herein. These drawings depict only exemplary embodiments of the inventive concepts, and should not be considered to limit their scope in any way.

Embodiments of the inventive concepts disclosed herein are directed to a system and related method for certified safety-critical avionics operations aboard an aircraft. The proposed system incorporates multi-core processing compliant with current regulatory requirements for safe execution by running safety-critical applications for each of multiple positions aboard the aircraft (e.g., the location of each redundant processing element, or RPE) in a separate core. By incorporating external architectural mitigation for each core, the system ensures external fault detection, processing, and analysis, generating in-service data about the performance of each core which populates a comprehensive service record demonstrating the equivalence of multi-core processing to current approaches. Generated in-service data may also enhance system maintenance reporting by providing a baseline for assessing the operational health of specific cores within a dual-core or multi-core processing unit, or for assigning and de-assigning RPEs and their related safety-critical applications to or from a particular processing core based on the core's fault history. For example, processing cores displaying consistently high fault trends may be selected away from, or processing units whose cores display atypical fault distributions may be flagged for further or special analysis pursuant to regular maintenance.

Figure 1:
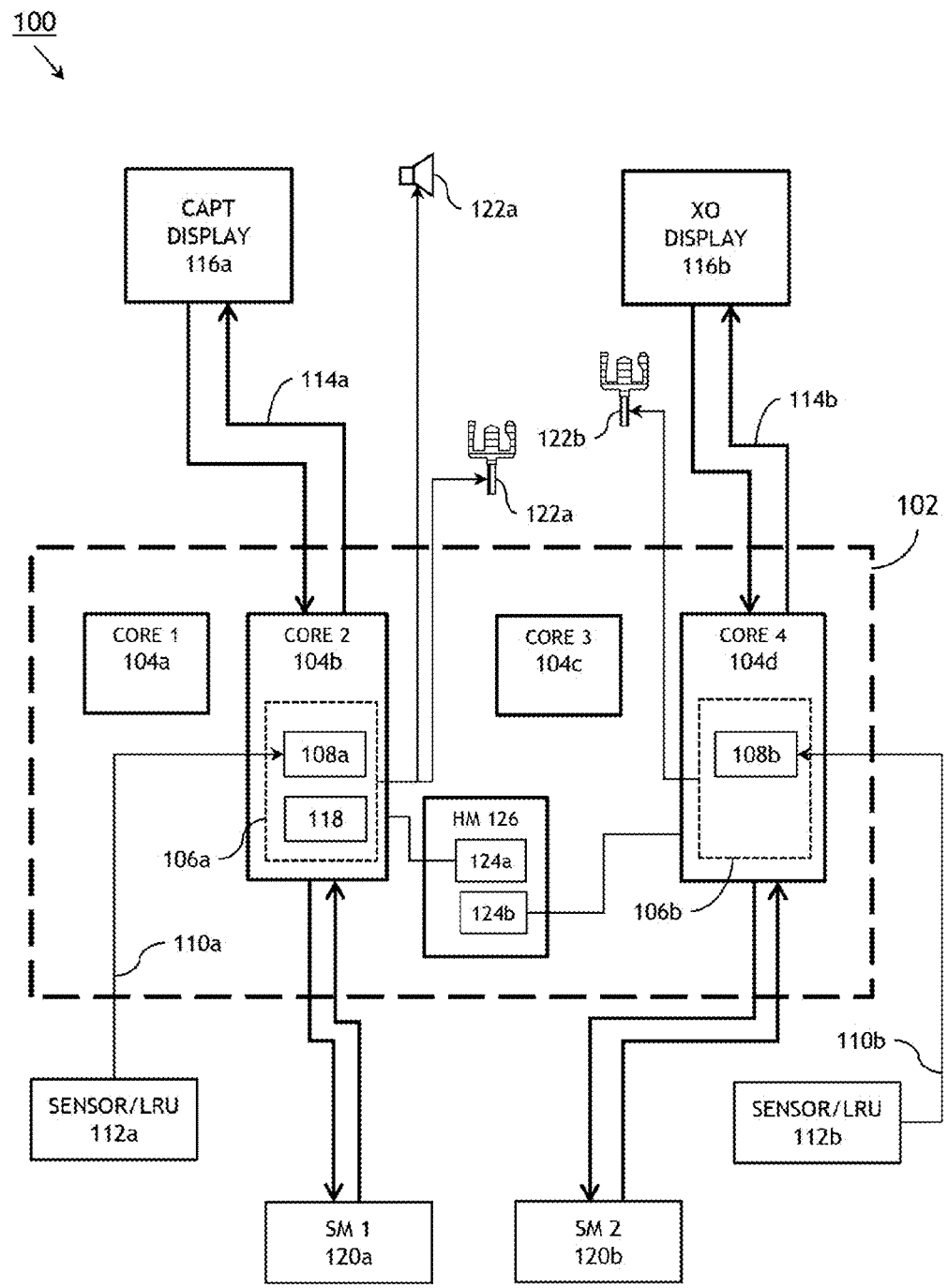
FIG. 1 is a block diagram illustrating a system according to embodiments of the inventive concepts disclosed herein.

Referring to FIG. 1, a system 100 for certified safety-critical avionics operations aboard an aircraft according to embodiments of the inventive concepts disclosed herein may incorporate a multi-core processor (MCP) 102 including several processing cores 104a-d. The system 100 may include any number of processing cores 104a-d distributed among any combination of single-core, dual-core, and multi-core processing units (not shown). The system 100 may include a group of redundant processing elements (RPE) 106a, b, each RPE 106a,b corresponding to a particular position in the chipset of the MCP 102 and assigned to an associated processing core 104b, 104d of the MCP 102. For example, in an implementation of the system 100 as shown by FIG. 1, wherein the system 100 includes two RPEs 106a, 106b and the MCP 102 includes four processing cores 104a-d, the RPE 106a may be a primary (e.g., captain's, pilot's) graphics generation module (GGM) and the RPE 106b a secondary (e.g., XO's, co-pilot's) GGM. The primary and secondary RPEs 106a,b may be assigned to specific processing cores 104b, 104d based on, e.g., the previous fault histories of each processing core 104a-d or the collective fault history of one or more processing units (not shown) of the MCP 102. Whether or not a particular processing core 104a-d is a default core (e.g., CPU 0) of the MCP 102 is of no consequence. Some processing cores 104a-d of the MCP 102 may be inactive processing cores 104a,c not currently associated with an RPE 106a,b or a safety-critical application 108a,b.

Each RPE 106a,b of the system 100 may include one or more safety-critical applications 108a, b associated with the processing core 104b,d to which its associated RPE 106a,b is assigned, and configured to execute on the associated core 104b,d. For example, the safety-critical application 108a of the RPE 106a configured to execute on the processing core 104b may include a graphics generation application configured to receive a critical data parameter 110a from a sensor 112a of the aircraft. The safety-critical application 108a may generate a critical result 114a by processing the critical data parameter 110a, and a primary (e.g., captain's, pilot's) display unit 116a of the aircraft may continually generate a visual display of critical information (e.g., by drawing) based on the critical data parameter 110a or the generated critical result 114a. For example, a safety-critical application 108a,b may generate a critical result 114a,b by encrypting or otherwise processing the received critical data parameters 110a,b. In an implementation of the system 100 wherein the RPEs 106a,b include graphics generation modules, critical data parameters 110a,b sensed by a sensor 112a,b may be associated with the altitude (or radio altitude), attitude, airspeed, heading, glideslope (or localizer), engine data, or fuel quantity of the aircraft at any given point in time. The misleading or inaccurate display of such critical data parameters 110a,b or associated critical information (including critical results 114a,b) may result in hazardous or catastrophic failure. A sensor 112a,b may include an air data inertial reference unit (ADIRU), air data module (ADM), or other line replaceable unit (LRU). An RPE 106a may additionally include one or more non-critical applications 118, such as a synthetic vision system, configured to execute on unused portions of the associated processing core 104b in such a way that the operation of the non-critical application 118 does not interfere with or hinder that of a safety-critical application 108a executing on the same processing core 104b.

External fault detection and processing of safety-critical applications 108a,b executing on the processing cores 104b,d of the MCP 102 may be provided by one or more system monitors 120a,b. The system monitors 120a,b may detect a fault associated with a safety-critical application 108a,b (executing on a processing core 104b,d of the MCP 102) based on the critical data parameters 110a,b received from the safety-critical applications 108a,b assigned to the processing cores 104b,d and the critical results 114a,b generated by the safety-critical applications 108a,b. For example, the system monitors 120a,b may detect a fault by encrypting or otherwise processing the received critical data parameter 110a,b to generate an expected result, and comparing the expected result to the received critical result 114a,b generated by the safety-critical applications 108a,b. The system monitors 120a,b may detect a fault if a critical data parameter 110a is received by the system monitors 120a,b from a safety-critical application 108a,b but no corresponding critical result 114a,b is received from the safety-critical application 108a,b, or if a critical result 114a,b is received from the safety-critical application 108a,b that does not correspond to any received critical data parameter 110a,b.

A fault associated with a safety-critical application 108a,b and detected by the system monitors 120a,b of the system 100 may be logged or processed by the originating safety-critical application 108a,b. For example, upon detecting a fault associated with a safety-critical application 108a,b of the RPE 106a,b and executing on the processing core 104b,d of the MCP 102, the system monitor 120a,b may send a notification of the detected fault to the originating safety-critical application 108a,b. The safety-critical application 108a,b may generate an alert associated with the detected fault, alerting the pilot, captain, or crew of the aircraft via the display system 116a,b of the aircraft or via another warning device 122a,b. The warning device 122a,b may include a flight deck annunciator or other auditory warning device, or a tactile warning device such as a stick-shaker coupled to the captain's or first officer's flight controls. The safety-critical application 108a,b may reset the sensor 112a,b or LRU with which the safety-critical application 108a,b is associated.

The safety-critical application 108a,b may respond to a received notification of a detected fault by logging the fault to a fault log (fault history) 124a,b associated with the specific core 104b,d on which the safety-critical application 108a,b is executing. For example, the fault logs 124a,b for each processing core 104b,d may be maintained by a health monitor (HM) 126 of the MCP 102; the HM 126 may maintain additional fault logs (not shown) for currently inactive processor cores 104a,c. Entries in a fault log 124a,b may include the safety-critical application 108a,b associated with the detected fault, the processing core 104b,d on which the safety-critical application 108a,b is currently executing, or the RPE 106a,b including the safety-critical application 108a,b and assigned to the processing core 104b,d. As the system 100 builds a fault history for each processing core 104a-b of the MCP 102, each fault log 124a,b may be analyzed for optimal maintenance and certified operation of the MCP 102. For example, if the fault log 124b associated with the processing core 104d, to which the RPE 106b is currently assigned, indicates consistently higher than normal fault trends, the RPE 106b (and the safety-critical application 108b executing on the processing core 104d) may be reassigned to a currently inactive processing core 104a, 104c of the MCP 102. If the processing cores 104c and 104d are housed on a single processing unit (not shown) and both processing cores 104c,d indicate consistently high or atypical fault distributions, the RPE 106d may be reassigned to the currently inactive processing core 104a and the processing unit housing the processing cores 104c,d may be replaced or analyzed to address the high/atypical fault distributions.

Figure 2:
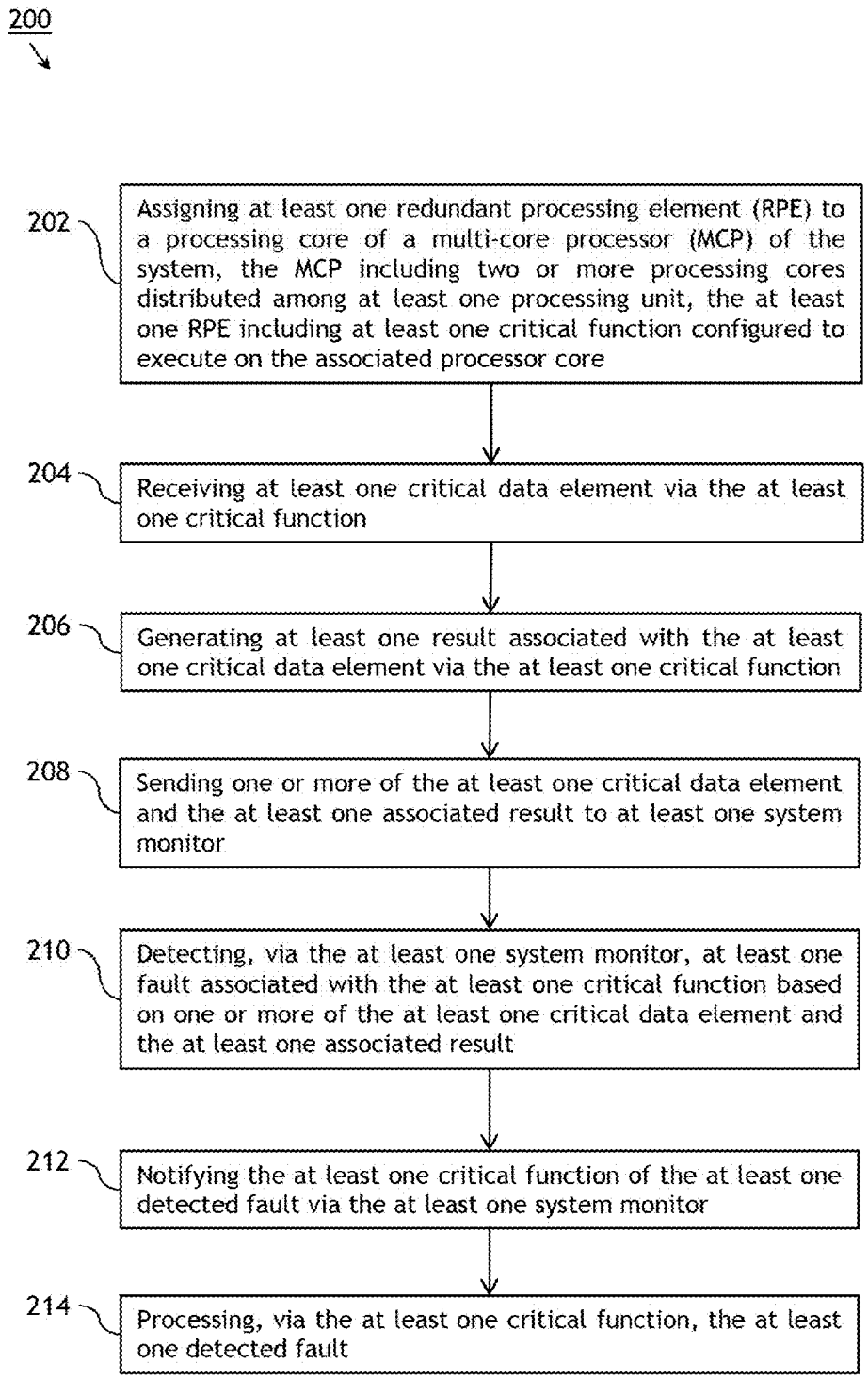
FIG. 2 is a process flow diagram illustrating a method according to embodiments of the inventive concepts disclosed herein.

Referring to FIG. 2, a method 200 for certified operation of a safety-critical avionics system incorporating a multi-core processor (MCP) architecture aboard an aircraft, the MCP architecture including one or more processing cores 104a-d distributed among at least one processing unit, is shown.

At a step 202, the method 200 assigns at least one redundant processing element (RPE) 106a,b to a processing core 104b,d of a multi-core processor (MCP) 102 of the system 100, the MCP 102 including two or more processing cores 104a-d distributed among at least one processing unit, the at least one RPE 106a,b including at least one safety-critical application 108a,b configured to execute on the associated processing core 104b,d. For example, an RPE 106a,b may be assigned to a processing core 104b,d based on a fault log 124a,b associated with the processing core 104b,d.

At a step 204, the method 200 receives at least one critical data parameter 110a,b via the at least one safety-critical application 108a,b. For example, the safety-critical application 108a,b may receive a critical data parameter 110a,b sensed by a sensor 108a,b of the aircraft.

At a step 206, the method 200 generates at least one critical result 114a,b associated with the at least one critical data parameter 110a,b via the safety-critical application 108a,b. For example, the safety-critical application 108a,b may generate a critical result 114a,b by encrypting a critical data parameter 110a,b.

At a step 208, the method 200 sends one or more of the critical data parameter 110a,b and the generated critical result 114a,b to at least one system monitor 120a,b of the system 100.

At a step 210, the method 200 detects at least one fault associated with the safety-critical application 108a,b via the system monitor 120a,b based on one or more of the at least one critical data parameter 110a,b and the at least one generated critical result 114a,b. For example, the system monitor 120a,b may compare at least one of a critical data parameter 110a,b and a critical result 114a,b.

At a step 212, the method 200 notifies the associated safety-critical application 108a,b of the detected fault via the system monitor 120a,b.

At a step 214, the method 200 processes the at least one detected fault via the at least one associated safety-critical application 108a,b. For example, the safety-critical application 108a,b may log the detected fault to a fault log 124a,b of a health monitor 126 of the MCP 102 (the fault log 124a,b associated with the processing core 104b,d) along with the associated safety-critical application 108a,b, the associated RPE 106a,b or the associated processing core 104b,d. The associated safety-critical application 108a,b may generate an alert associated with the detected fault and deliver the alert to a crewmember of the aircraft via a display system 116a,b or a warning device 122a,b of the aircraft. The associated safety-critical application 108a,b may reset the associated sensor 112a,b or LRU.

CONCLUSION

Specific blocks, sections, devices, functions, processes, and modules may have been set forth. However, a skilled technologist will realize that there are many ways to partition the system, and that there are many parts, components, processes, modules or functions that may be substituted for those listed above.

Those having skill in the art will recognize that the state of the art has progressed to the point where there may be little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs.

Additionally, implementations of embodiments disclosed herein may include executing a special-purpose instruction sequence or invoking circuitry for enabling, triggering, coordinating, requesting, or otherwise causing one or more occurrences of virtually any functional operations described herein.

While particular aspects of the inventive concepts disclosed herein have been shown and described, it will be apparent to those skilled in the art that, based upon the teachings herein, changes and modifications may be made without departing from the inventive concepts described herein and their broader aspects and, therefore, the appended claims are to encompass within their scope all such changes and modifications as are within the broad scope of the inventive concepts described herein.

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently.

We claim:

1. A certified safety critical avionics system, the system comprising:
   a multi-core processor (MCP) including two or more processing cores distributed among at least one processing unit;
   two or more redundant processing elements (RPE), each RPE associated with a processing core of the two or more processing cores, each RPE including at least one critical function configured to execute on the associated processing core, the at least one critical function configured to receive at least one critical data element; and generate at least one critical result associated with the at least one critical data element;
   at least one system monitor operatively coupled to the two or more processing cores, the at least one system monitor configured to:
   receive one or more of the at least one critical data element and the at least one associated critical result from the at least one critical function;
   detect at least one fault associated with the at least one critical function based on one or more of the at least one critical data element and the at least one associated critical result;
   notify the at least one critical function of the at least one detected fault;
   the at least one critical function further configured to process the at least one detected fault;
   at least one fault log of the MCP, the at least one fault log including one or more fault histories, each fault history associated with a processing core of the two or more processing cores; and
   at least one warning device communicatively coupled to the MCP,
   wherein at least one RPE of the two or more RPEs is assigned to the associated processing core based on a fault history associated with the associated processing core.

2. The system of claim 1, wherein the at least one processing unit includes at least one of a single-core processor, a dual-core processor, and a multi-core processor having three or more processing cores.

3. The system of claim 1, wherein the at least one critical data element includes at least one parameter received from a sensor of the aircraft.

4. The system of claim 1, wherein the at least one system monitor is configured to detect the at least one fault by comparing the at least one critical data element and the at least one associated critical result.

5. The system of claim 1, wherein the at least one critical function is configured to generate the at least one associated critical result by encrypting the at least one critical data element.

6. The system of claim 1, wherein the at least one critical function is configured to process the at least one detected fault by logging one or more of a) the at least one detected fault, b) the at least one critical function associated with the at least one detected fault, c) the at least one RPE associated with the at least one detected fault, and d) the at least one processing core associated with the at least one critical function to the at least one fault log.

7. The system of claim 1, wherein the at least one critical function associated with the at least one detected fault is configured to:
   generate at least one alert associated with the at least one detected fault; and
   deliver the at least one alert to at least one crewmember of the aircraft via the at least one warning device.

8. The system of claim 1, wherein the at least one warning device includes at least one of an auditory warning device, a visual display system, and a tactile warning device.

9. The system of claim 1, wherein the at least one critical function includes at least one safety-critical avionics application.

10. A method for certified operation of a safety-critical avionics system, the method comprising:
   assigning at least one redundant processing element (RPE) to a processing core of a multi-core processor (MCP) of the system based on a fault history associated with the processing core, the MCP including two or more processing cores distributed among at least one processing unit, the at least one RPE including at least one critical function configured to execute on the associated processing core;
   receiving at least one critical data element via the at least one critical function;

generating at least one critical result associated with the at least one critical data element via the at least one critical function;

sending one or more of the at least one critical data element and the at least one associated critical result to at least one system monitor;

detecting, via the at least one system monitor, at least one fault associated with the at least one critical function based on one or more of the at least one critical data element and the at least one associated critical result;

notifying the at least one critical function of the at least one detected fault via the at least one system monitor; and processing, via the at least one critical function, the at least one detected fault, wherein processing, via the at least one critical function, the at least one detected fault includes:

logging, via the at least one critical function, one or more of a) the at least one detected fault, b) the critical function associated with the at least one detected fault, c) one more RPEs associated with the at least one detected fault, and d) at least one processing core associated with the at least one detected fault to at least one fault history of the system, the at least one fault history associated with the at least one processing core.

11. The method of claim 10, wherein receiving at least one critical data element via the at least one critical function includes:

receiving at least one parameter sensed by a sensor of the aircraft via the at least one critical function.

12. The method of claim 11, wherein processing, via the at least one critical function, the at least one detected fault includes:

resetting, via the at least one critical function, the at least one sensor.

13. The method of claim 10, wherein generating at least one result associated with the at least one critical data element via the at least one critical function includes:

generating at least one result associated with the at least one critical data element by encrypting the at least one critical data element via the at least one critical function.

14. The method of claim 10, wherein detecting, via the at least one system monitor, at least one fault associated with the at least one critical function based on one or more of the at least one critical data element and the at least one associated result includes:

detecting, via the at least one system monitor, at least one fault associated with the at least one critical function by comparing the at least one critical data element and the at least one associated result.

15. The method of claim 10, wherein processing, via the at least one critical function, the at least one detected fault includes:

generating, via the at least one critical function, at least one alert associated with the at least one detected fault; and delivering the at least one alert to at least one crewmember of the aircraft via at least one warning device.

* * * * *